(12) United States Patent
Honert et al.

(10) Patent No.: US 9,028,609 B2
(45) Date of Patent: May 12, 2015

(54) ADDITIVE FOR MINERAL BINDING AGENTS HAVING REDUCED BROWN DISCOLORATION POTENTIAL

(75) Inventors: Dieter Honert, Dielheim (DE); Thomas Heller, Nussloch (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/492,648

(22) Filed: Jun. 8, 2012

(65) Prior Publication Data

US 2012/0304892 A1 Dec. 6, 2012

Related U.S. Application Data

(63) Continuation of application No. PCT/EP2010/068870, filed on Dec. 3, 2010.

(30) Foreign Application Priority Data

Dec. 8, 2009 (EP) .................................. 09178250

(51) Int. Cl.
| | | |
|---|---|---|
| *C04B 24/02* | (2006.01) | |
| *C04B 40/00* | (2006.01) | |
| *C04B 103/52* | (2006.01) | |
| *C04B 111/10* | (2006.01) | |

(52) U.S. Cl.
CPC ......... *C04B 40/0039* (2013.01); *C04B 2103/52* (2013.01); *C04B 2111/1006* (2013.01)

(58) Field of Classification Search
CPC ........ C04B 24/02; C04B 24/04; C04B 24/06; C04B 24/10; C04B 24/42; C04B 24/003; C04B 40/0039; C04B 22/0013; C04B 2103/52
USPC .................................. 106/724, 727, 728, 757
See application file for complete search history.

(56) References Cited

U.S. PATENT DOCUMENTS

| | | | | |
|---|---|---|---|---|
| 4,943,323 | A * | 7/1990 | Gartner et al. ................. | 106/808 |
| 5,017,234 | A * | 5/1991 | Gartner et al. ................. | 106/781 |
| 5,108,511 | A | 4/1992 | Weigland | |
| 5,125,976 | A * | 6/1992 | Skvara et al. ................. | 106/724 |
| 5,294,256 | A * | 3/1994 | Weigand et al. ............... | 106/819 |
| 5,429,675 | A * | 7/1995 | Cheung et al. ................ | 106/802 |
| 6,048,393 | A * | 4/2000 | Cheung et al. ................ | 106/727 |
| 6,290,772 | B1 * | 9/2001 | Cheung et al. ................ | 106/727 |
| 6,387,176 | B1 | 5/2002 | Widmer et al. | |
| 6,641,661 | B1 * | 11/2003 | Jardine et al. ................. | 106/802 |
| 6,800,129 | B2 * | 10/2004 | Jardine et al. ................. | 106/724 |
| 6,872,247 | B1 * | 3/2005 | Jardine et al. ................. | 106/808 |
| 7,670,428 | B2 | 3/2010 | Strachan | |
| 7,922,811 | B2 * | 4/2011 | Jardine et al. ................. | 106/823 |
| 8,119,727 | B2 * | 2/2012 | Pakusch et al. ................ | 524/558 |
| 8,567,703 | B2 * | 10/2013 | Shimoda et al. ................ | 241/22 |
| 2002/0002218 | A1 | 1/2002 | Velten et al. | |
| 2003/0024441 | A1 | 2/2003 | Shimoyama et al. | |
| 2004/0149172 | A1 * | 8/2004 | Jardine et al. ................. | 106/724 |
| 2004/0259983 | A1 | 12/2004 | Okazawa et al. | |
| 2006/0004148 | A1 | 1/2006 | Sulser et al. | |
| 2006/0032409 | A1 | 2/2006 | Okazawa et al. | |
| 2006/0086291 | A1 * | 4/2006 | Jardine ......................... | 106/757 |
| 2008/0011201 | A1 | 1/2008 | Strachan | |
| 2008/0227890 | A1 * | 9/2008 | Maeder et al. ................. | 524/5 |
| 2010/0193982 | A1 * | 8/2010 | Genolet et al. ................ | 264/36.2 |
| 2011/0146540 | A1 * | 6/2011 | Jardine et al. ................. | 106/790 |
| 2011/0306704 | A1 * | 12/2011 | Cheung et al. ................ | 523/401 |
| 2012/0174831 | A1 * | 7/2012 | Hurley et al. ................. | 106/808 |
| 2012/0255733 | A1 * | 10/2012 | Genolet et al. ................ | 166/285 |
| 2013/0112113 | A1 * | 5/2013 | Sagawa et al. ................ | 106/638 |
| 2013/0180434 | A1 * | 7/2013 | Jardine et al. ................. | 106/503 |
| 2013/0180436 | A1 * | 7/2013 | Jardine et al. ................. | 106/808 |

FOREIGN PATENT DOCUMENTS

| | | | |
|---|---|---|---|
| EP | 0 453 921 | A1 | 4/1991 |
| EP | 1 138 696 | A1 | 10/2001 |
| EP | 1 160 219 | A1 | 12/2001 |
| EP | 1 426 349 | A1 | 6/2004 |
| JP | 54-015931 | A | 2/1979 |
| JP | S5415931 | A | 2/1979 |
| WO | 00/76936 | A1 | 12/2000 |
| WO | WO 2006/050567 | A1 | 5/2006 |

OTHER PUBLICATIONS

JP 05032438 A (Feb. 9, 1993) Tanaka et al. abstract only.*
JP 05032438 A (Feb. 9, 1993) Tanaka et al. Machine Translation into English.*
International Search Report (PCT/ISA/210) issued on Apr. 27, 2011, by the Japanese Patent Office as the International Searching Authority for International Application No. PCT/EP2010/068870.
Written Opinion (PCT/ISA/237) issued on Apr. 27, 2011, by the Japanese Patent Office as the International Searching Authority for International Application No. PCT/EP2010/068870.
Härdtl et al., "Reducing the risk of brown discoloration of concrete products", BFT Betonwerk + Fertigteil-Technik, 2003 (month unknown), No. 11, pp. 34-46.
Database WPI, Week 200132, Thomson Scientific, London, GB; AN 2001-303688, XP002587685, Jan. 23, 2001, 2 pages.
English Translation of Japanese Office Action (Notice of Reasons for Rejection) dated Feb. 24, 2014, in corresponding Japanese Application No. 2012-542474. (5 pgs).

* cited by examiner

*Primary Examiner* — Paul Marcantoni
(74) *Attorney, Agent, or Firm* — Buchanan Ingersoll & Rooney PC

(57) ABSTRACT

An additive composition including a grinding aid selected from glycols, monocarboxylic acids with 1 to 4 carbon atoms, and comb polymers; as well as at least one retardant, which can be used during the process of grinding cement clinker and which leads to low brown discoloration of the ground cement in the processed state.

13 Claims, No Drawings

ADDITIVE FOR MINERAL BINDING AGENTS HAVING REDUCED BROWN DISCOLORATION POTENTIAL

RELATED APPLICATION(S)

This application claims priority as a continuation application under 35 U.S.C. §120 to PCT/EP2010/068870, which was filed as an International Application on Dec. 3, 2010 designating the U.S., and which claims priority to European Application No. 09178250.8 filed in Europe on Dec. 8, 2009. The entire contents of these applications are hereby incorporated by reference in their entireties.

FIELD

The disclosure relates to additives in the grinding and mixing process of hydraulic binding agents and/or latent hydraulic binding agents. The additive of the disclosure can exhibit excellent retardation effect in hydraulically binding compositions which contain clinker that is ground with the additive of the disclosure.

BACKGROUND INFORMATION

A step in the making of cement is the grinding of the cement clinker. Since cement clinkers are very hard, the fragmentation is very energy-intensive. It can be desirable for the properties of the cement that it be present as a fine powder. Therefore, the fineness of the cement can be a quality feature of interest. In order to facilitate the fragmenting into powder form, so-called cement grinding aids are used. In this way, the grinding times and energy costs are greatly reduced.

Organic amines with a molecular weight Mw of less than 500 g/mol, or their ammonium salts, are widespread grinding aids. Examples of such organic amines are alkanolamines such as trialkanolamines, triisopropanolamine (TIPA) or triethanolamine (TEA). However, they can have the drawback that, after a certain quantity, they accelerate the start of the stiffening, or the time difference between the end of solidification and the beginning of solidification, i.e., they act as accelerators.

In order for aqueous hydraulic binding agents to be workable for a longer time, binding retardants are added, also known hereafter as retardants, in order to drag out the onset of stiffening, or increase the time difference between the end of solidification and the beginning of solidification. The adding of these retardants to the hydraulic binding agents can be done with the adding of the mixing water or shortly thereafter.

Another problem of grinding aids is that they can promote brown discolorations of the set hydraulic binding agents. There is relatively little reliable data as to the influence of grinding aids on the formation of brown discolorations (Reducing the risk of brown discoloration of concrete objects, Härdtl et al, BFT Betonwerk+Fertigteil-Technik, No. 11, 2003, pages 34-46, Bauverlag).

SUMMARY

According to an exemplary aspect, an additive composition is disclosed, comprising: at least one grinding aid selected from the group consisting of a glycol, a monocarboxylic acid with 1 to 4 carbon atoms, a comb polymer, and a combination thereof, and at least one retardant, wherein an amount of organic amines with a molecular weight Mw of less than 500 g/mol and ammonium salts thereof in the additive composition is 0-2 wt. %, with respect to the weight of the additive composition.

According to an exemplary aspect, a method for producing a mineral binding agent is disclosed, the method comprising: a) adding the exemplary additive composition before and/or during a grinding process of a cement clinker which is contained in a mineral binding agent, wherein an amount of the additive composition is 0.005-0.5 wt %, with respect to the cement clinker being ground.

According to an exemplary aspect, a method of delaying a setting of an aqueous mineral binding agent is provided, the method comprising: preparing an aqueous mineral binding agent by a process including grinding a composition comprising a cement clinker and an exemplary additive composition.

According to an exemplary aspect, a method of preparing a composition, the method comprising adding an exemplary additive composition to a cement clinker.

DETAILED DESCRIPTION

According to an exemplary aspect, provided are new additive compositions for the grinding and mixing process of hydraulic binding agents which, for example, do not have the mentioned drawbacks discussed above, for example, which have especially good binding-retarding properties and contribute little if at all to the promotion of brown discolorations.

According to an exemplary aspect, it has now been found that the drawbacks of the known grinding aids can be eliminated, or greatly reduced, by the additive composition Z of the disclosure, without sacrificing the beneficial effects of the usual cement grinding aids.

According to an exemplary aspect, it has further been found that the presence of retardants in the additive composition Z can have no negative influence on the efficiency of the grinding process.

According to an exemplary aspect, it has been found that the adding of additive composition Z can have no negative influence on the compressive strength of the set mineral binding agent.

According to an exemplary aspect, it has been found that the retardant does not lose its retarding effect in the course of the grinding process. For example, due to the more fine distribution of the retardant achieved in the course of the grinding process, substantially less retardant can be used as compared to that added with the mixing water.

Disclosed is an additive composition Z comprising at least one grinding aid chosen from glycols, monocarboxylic acids with 1 to 4 carbon atoms, and comb polymers, as well as at least one retardant, wherein the additive composition Z is substantially free of organic amines with a molecular weight Mw of less than 500 g/mol, or their ammonium salts.

For example, the weight fraction of grinding aid is 0.2-99.8 wt. %, in terms of the weight of the additive composition Z.

The comb polymer can include a straight polymer chain (for example, a main chain), to which side chains are joined across ester or ether groups. The side chains figuratively speaking form the "teeth" of a "comb".

For example, the comb polymer is a comb polymer KP with side chains joined to the main chain across ester or ether groups.

Suitable as the comb polymer KP are, on the one hand, comb polymers with side chains connected to the straight polymer backbone across ether groups.

Side chains connected by ether groups to the straight polymer backbone can be introduced by polymerization of vinyl ethers or allyl ethers.

Such comb polymers are disclosed, for example, in WO 2006/133933 A2, whose content is incorporated herein by reference. The vinyl ethers or allyl ethers have, for example, the following structure (II).

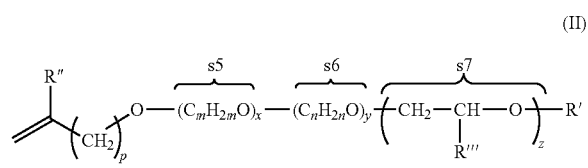
(II)

Here, R' stands for H or for an aliphatic hydrocarbon residue with 1 to 20 C atoms or a cycloaliphatic hydrocarbon residue with 5 to 8 C atoms or an optionally substituted aryl residue with 6 to 14 C atoms. R" stands for H or for a methyl group and R''' stands for an unsubstituted or substituted aryl residue, for example, a phenyl residue.

p stands for 0 or 1; m and n independently of each other each stands for 2, 3 or 4; and x and y and z independently of each other each stands for values in the range of 0 to 350.

The sequence of substructure elements designated as s5, s6 and s7 in formula (II) can be arranged alternating, in block fashion, or randomly.

For example, such comb polymers are copolymerizates of vinyl ether or allyl ether with maleic anhydride, maleic acid, and/or (meth)acrylic acid.

On the other hand, suitable as the comb polymer KP are comb polymers with side chains connected to the straight polymer backbone by ester groups. This kind of comb polymer KP can be used, and/or the comb polymers with side chains connected to the straight polymer backbone by ether groups can be used.

Exemplary comb polymers KP are copolymers of the formula (I).

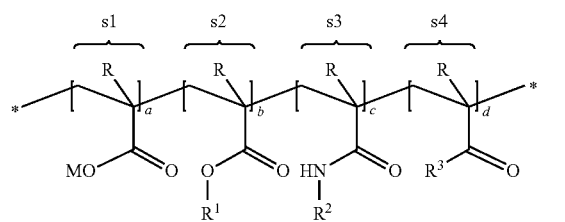
(I)

Here, the Ms stand independently of each other for H+, alkaline metal ion, alkaline earth metal ion, divalent or trivalent metal ion, ammonium ion, or organic ammonium group. The term "independently of each other" means that a substituent each time can have the same or different available meanings in the same molecule. For example, the copolymer of formula (I) can have carboxylic acid groups and sodium carboxylate groups at the same time, that is, in this case M signifies H+ and Na+ independently of each other.

A carboxylate to which the M ion is bound, and on the other hand the charge of polyvalent ions M can be counterbalanced by opposite ions.

Furthermore, the substituents R stand independently of each other for hydrogen or for a methyl group.

The substituents R1 stand independently of each other for [AO]q-R4. The substituents R2 stand independently of each other for a C1 to C20 alkyl group, cycloalkyl group, alkylaryl group or for [AO]q-R4. The substituent A stands, in both cases independently of each other, for a C2 to C4 alkylene group, and R4 for a C1 to C20 alkyl group, cyclohexyl group or alkylaryl group, while q represents a value of 2 to 250, for example, 8 to 200, for example, 11 to 150.

The substituents R3 stand independently of each other for —NH2, —NR5R6, —OR7NR8R9. Here, R5 and R6 independently of each other stand for a C1 to C20 alkyl group, cycloalkyl group or alkylaryl group or aryl group or for a hydroxyalkyl group or for an acetoxyethyl (CH3-CO—O—CH2-CH2-) or a hydroxy-isopropyl (HO—CH(CH3)-CH2-) or an acetoxyisopropyl (CH3-CO—O—CH(CH3)-CH2-) group; or R5 and R6 together form a ring, of which nitrogen is a part, to construct a morpholine or imidazoline ring.

The substituent R7 stands for a C2-C4 alkylene group.

Furthermore, the substituents R8 and R9 each stand independently of each other for a C1 to C20 alkyl group, cycloalkyl group, alkylary group, aryl group or for a hydroxyalkyl group.

The sequence of substructure elements designated as s1, s2, s3 and s4 in formula (I) can be arranged alternating, in block fashion, or randomly.

Finally, the indices a, b, c and d represent molar ratios of the structural units s1, s2, s3 and s4. These structural elements stand in a ratio of a/b/c/d=(0.1-0.9)/(0.1-0.9)/(0-0.8)/(0-0.3), for example a/b/c/d=(0.1-0.9)/(0.1-0.9)/(0-0.5)/(0-0.1), for example a/b/c/d=(0.1-0.9)/(0.1-0.9)/(0-0.3)/(0-0.06), to each other, provided that a+b+c+d=1. The sum c+d can be greater than 0.

The preparation of the comb polymer KP of formula (I) can occur, on the one hand, by radical polymerization of the corresponding monomers of formula (IIIa), (IIIb), (IIIc) or (IIId), which then leads to the structural elements/structural units s1, s2, s3 and s4,

(IIIa)

(IIIb)

(IIIc)

(IIId)

or on the other hand by a so-called polymer-analogous reaction of a polycarboxylic acid of formula (IV)

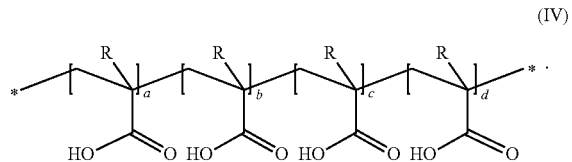

In the polymer-analogous reaction, the polycarboxylic acid of formula (IV) is esterified or amidated with the corresponding alcohols or amines and then neutralized or partly neutralized, if desired (depending on the type of residue M, e.g., with metal hydroxides or ammonia).

Details on the polymer-analogous reaction are disclosed, for example, in US Patent Application Publication No. 2002/0002218 A1 on page 5 in paragraph [0077] up to and including [0083], and also in its examples, or in U.S. Pat. No. 6,387,176 B1 on page 5, line 18 to line 58 and also in its examples. In one modification of this, as described in US Patent Application Publication No. 2006/0004148 A1 on page 1 in paragraph [0011] up to and including [0055] on page 3 and in its examples, the comb polymer KP of formula (I) can be prepared in the solid state of aggregation. The contents of US Patent Application Publication No. 2002/0002218 A1, U.S. Pat. No. 6,387,176 B1, and US Patent Application Publication No. 2006/0004148 A1 are hereby incorporated by reference.

It turns out that an exemplary embodiment of the comb polymers KP of formula (I) are those in which c+d>0, for example, d>0. As the residue R3, —NH—CH2-CH2-OH can be employed.

The comb polymers KP commercially marketed by Sika Schweiz A G under the brand series ViscoCrete® can be employed.

If there are comb polymers in the grinding aid, the weight fraction can be 0.2-40 wt. %, for example, 5-35, for example, 15-35 wt. %, in terms of the weight of the additive composition Z.

Examples of the glycols are alkylene glycols, for example, those of formula OH—(CH2-CH2O)u-CH2CH2-OH with u=0-20, for example, 0, 1, 2 or 3.

Suitable as possible glycols are those which are chosen from ethylene glycol, propylene glycol, polyethylene glycol, polypropylene glycol, diethylene glycol, triethylene glycol, dipropylene glycol, tripropylene glycol, reaction products of ethylene and propylene oxide, reaction products of polypropylene glycol with compounds with active basic hydrogen (polyalcohols, polycarboxylic acids, polyamines, or polyphenols), neopentyl glycol, pentane diol, butane diol and unsaturated diols, as well as mixtures thereof and their derivates.

Exemplary glycols are mono-, di- and polyglycols of ethylene and propylene, as well as mixtures thereof, since they are cheap and readily water-soluble. Exemplary are diglycols, for example, diethylene glycol.

If glycols are present in the grinding aid, the weight fraction can be 0.2-99.8 wt. %, for example, 5-50 wt. %, for example, 15-30 wt.-%, in terms of the weight of the additive composition Z.

Examples of monocarboxylic acids with 1 to 4 carbon atoms are formic acid, acetic acid, propionic acid and butanic acid, for example, acetic acid.

If there are monocarboxylic acids with 1 to 4 carbon atoms in the grinding aid, the weight fraction can be 0.2-15 wt. %, for example, 1-5 wt. %, for example, 2-4 wt.-%, in terms of the weight of the additive composition Z.

For example, it is possible to not use as grinding aid organic amines with a molecular weight Mw less than 500 g/mol, such as alkanol amines, for example, trialkanol amines like triisopropanol amine (TIPA) or triethanol amine (TEA) or ammonium salts of organic amines. For example, these can have the drawback that, after a certain quantity, they accelerate the start of stiffening, or shorten the time difference between the end of solidification and the start of solidification, i.e., they act as an accelerant. It has further been found in the context of this disclosure that these cement grinding aids lead to a brown discoloration of the set hydraulic binding agents.

In an exemplary embodiment, the additive composition Z can be essentially free of the mentioned organic amines with a molecular weight Mw of less than 500 g/mol and ammonium salts thereof. For example, the total fraction of organic amines with a molecular weight Mw of less than 500 g/mol and ammonium salts thereof, can be 0-2 wt. %, for example, 0-0.1 wt. %, in terms of the weight of the additive composition Z. For example, the fraction of the mentioned organic amines can be so low that no accelerating effect and/or brown discoloration of the set hydraulic binding agent can be detected. For example, the additive composition Z can be free of the mentioned organic amines.

The additive composition Z comprises at least one retardant.

The retardant can be an additive which drags out the start of stiffening in aqueous mineral binding agents containing this additive or increase the time difference between the end of solidification and the start of solidification, as compared to aqueous mineral binding agents without the addition of this additive.

Suitable retardants are for example cellulose ether, casein and dextrin or inorganic compounds like zinc and lead and complexing agents for calcium and those with which calcium forms compounds that are poorly soluble, such as phosphates, phosphonates, silicone fluorides, as well as boric acid, tartaric acid, gluconic acid, heptonic acid, citric acid, gallic acid, malic acid, and the salts of the mentioned acids, saccharose, glucose, and fructose.

For example, the at least one retardant is chosen from cellulose ether, casein, dextrin, zinc, lead, phosphates, phosphonates, silicone fluorides, boric acid, oxalic acid, lactic acid, succinic acid, adipic acid, tartaric acid, gluconic acid, heptonic acid, citric acid, gallic acid, malic acid, saccharose, glucose and fructose, or the salts of the mentioned acids.

For example, the at least one retardant is chosen from boric acid, gluconic acid, saccharose, glucose and fructose, or the salts of the mentioned acids.

It can be desirable for the weight fraction of retardant to amount to 0.2-30 wt. %, in terms of the weight of the additive composition Z. If the retardant happens to be boric acid, the weight fraction can amount to 0.2-10 wt. %; in the case of saccharose, glucose, fructose or gluconate, it can be 5-30 wt. %, in terms of the weight of the additive composition Z.

The mineral binding agents are hydraulic binding agents and/or latent hydraulic binding agents and/or puzzolanic binding agents. The hydraulic binding agent can include binding agents that also set, or harden, under water, such as hydraulic lime or cement. The latent hydraulic binding agent can include binding agents that only set, or harden, by the action of additives (initiators), such as foundry sand. The puzzolanic binding agent can include binding agents that do not set spontaneously, but only after wet storage they provide strength-forming reaction products by binding of calcium hydroxide, such as fly ash, silica fume, and natural puzzolans, such as trass.

For example, the hydraulic binding agent is cement.

The additive composition Z can be present as a loose composition, such as a powder, or as a fluid composition, such as an aqueous composition.

The additive composition Z can contain other components. Examples of these are solvents or additives suitable for use in concrete technology, for example, surface-active substances, heat and light stabilizers, colorants, defoamers, corrosion inhibitors, and air pore formers.

One possible exemplary additive composition Z comprises:

alkylene glycol, for example, diethylene glycol, 15-30 wt. %, in terms of the additive composition Z;
comb polymer KP of formula (I), 15-35 wt. %, in terms of the additive composition Z;
acetic acid, 1-5 wt. %, in terms of the additive composition Z;
gluconate, 10-20 wt. %, in terms of the additive composition Z; or boric acid, 1-5, for example, 2-4 wt. %, in terms of the additive composition Z.

For example, the additive composition Z also has;
preservative, 0.1-0.4 wt. %, in terms of the additive composition Z;
defoamer, 0.1-0.4 wt. %, in terms of the additive composition Z.

In another exemplary embodiment, a method of production of mineral binding agents is provided, comprising:

a) adding an additive composition Z, as has been described above, before and/or during the grinding process of cement clinker which is contained in the mineral binding agent.

The fraction of additive composition Z amounts to 0.005-0.5 wt. %, for example, 0.01-0.2 wt. %, for example, 0.025-0.1 wt. %, in terms of the cement clinker being ground.

Of course, the individual components of the additive composition Z, for example, the at least one grinding aid or the at least one retardant, can be added separated from each other in time before and/or during the grinding process of cement clinker.

The cement clinker can have bodies, for example, the size of a walnut, that are formed upon heating of the lime and clay mixtures to 1250-1500° C. and that yield cement when ground up.

In an exemplary embodiment, substantially smaller concentrations of retardant in relation to the cement clinker can be used effectively to delay the setting of mineral binding agents, including cement clinker ground with additive composition Z, than are added in a comparative technique to the mineral binding agent as retarding additive, for example, with the mixing of water or afterwards.

The grinding process can occur in a cement mill. Other mills can be used that are suitable for use in the cement industry. Depending on the grinding time, the cement will have different fineness. The fineness of cement can be indicated per Blaine in cm2/g. The particle size distribution is also of practical relevance for the fineness. Such particle size analysis can be done by laser granulometry or air jet screening.

The cement so ground, like any other ground cement, can find broad application in concrete, mortar, casting compounds, injections or plastering.

If additive composition Z is added to the cement before and/or during the grinding of the cement clinker, and after being mixed with water, that is, in the aqueous mineral binding agent, for example, in mortar and concrete, a delay of the setting of the aqueous mineral binding agent is apparent as compared to cement ground with comparative grinding aids, for example, compared to cement ground with organic amines. For example, less brown discoloration is noticeable as compared to cement to which organic amine was added as grinding aid during the grinding of the cement clinker.

According to an exemplary embodiment, later adding of retardant is not required and therefore the user of the cement can economize on labor. Such a cement therefore can be a "ready-to-use" product, which can be produced in large quantities. In an exemplary embodiment, the ability of the additive composition Z to delay the setting of aqueous mineral binding agents is not impaired by the grinding process.

In an exemplary embodiment, the adding of additive composition Z has no negative influence on the efficiency of the grinding process.

In an exemplary embodiment, the adding of additive composition Z would not impair the effect of grinding aids during the grinding process.

In an exemplary embodiment, the additive composition Z, as was described above, is used to delay the setting of an aqueous mineral binding agent, wherein the aqueous mineral binding agent comprises cement clinker ground with additive composition Z, wherein during grinding to cement the additive composition Z is present. The mineral binding agents are mineral binding agents as were described above.

EXAMPLES

The disclosure will now be explained more closely by means of examples.

TABLE

Additives used

| Name | Manufacturer |
| --- | --- |
| Triisopropanolamine (TIPA) | BASF SE, Germany |
| Diethylene glycol (DEG) | Hansa Chemie AG, Switzerland |
| comb polymer, with side chains connected to the polymer backbone by ester groups (PCE), Sika ViscoCrete ®-20 HE | Sika Schweiz AG, Switzerland |
| Triethanolamine (TEA) | BASF SE, Germany |
| Acetic acid | Brenntag, Switzerland |
| (VZ1), Aminophosphonic acid | Zschimmer und Schwarz GmbH, Germany |
| (VZ2), Gluconate | Jungbunzlauer AG, Switzerland |
| (VZ3), Boric acid | Merck, Germany |

The additives V1 to V4 (comparison examples) and Z1 to Z4 (examples according to exemplary aspects) were used in the grinding process.

The additives were added to the cement clinker being ground according to the quantities in table 2, or table 6, shortly before the grinding.

TABLE 1

Components used to form additive compositions (in wt. %)

|  | V1 | V2 | V3 | V4 | Z1 | Z2 | Z3 | Z4 |
| --- | --- | --- | --- | --- | --- | --- | --- | --- |
| PCE | 20 |  | 20 |  | 20 | 30 | 20 | 20 |
| DEG | 20 |  |  |  | 20 | 25 | 20 | 25 |
| TEA |  | 8 |  | 8 |  |  |  |  |
| TIPA |  | 38 | 26 | 38 |  |  |  |  |
| Acetic acid | 2 |  | 7 |  | 2 | 4 | 2 | 4 |
| VZ1 |  |  | 42 | 54 |  |  |  |  |
| VZ2 |  |  |  |  |  |  | 15 | 15 |

TABLE 1-continued

Components used to form additive compositions (in wt. %)

|  | V1 | V2 | V3 | V4 | Z1 | Z2 | Z3 | Z4 |
|---|---|---|---|---|---|---|---|---|
| VZ3 |  |  |  |  |  | 3 | 3 |  |
| K—Na-cumene sulfonate |  |  | 5 |  |  |  |  |  |
| Water | 58 | 54 | 0 | 0 | 55 | 38 | 43 | 36 |
| Total | 100 | 100 | 100 | 100 | 100 | 100 | 100 | 100 |

Cement Clinker Used

The cement clinker used consisted of 60% C3S, 20% C2S, 10% C3A and 10% C4AF.

Grinding of the Cement Clinker 20 kg of a mixture of the particular cement clinker and one of the particular additives, or without additive, were blended in the dosage as indicated in table 2 and ground in a drum ball mill of the Siebtechnik company at a temperature of 100° C., with a rotational speed of 40 revolutions per minute.

Test Methods

Grinding time 4000: the time was determined until the mixture after a grinding in the ball mill had a Blaine fineness per DIN EN 196-6 of 4000 cm2/g.

Fineness: the fineness was determined after Blaine using the Blaine Automat of the Wasag Chemie company.

The results are given in table 2.

TABLE 2

Quantity of additive and grinding time

| | Quantity of additive (wt. %*) | Grinding time (min) |
|---|---|---|
| no addition | — | 75 |
| V1 | 0.05 | 68 |
| Z2 | 0.05 | 68 |
| Z3 | 0.05 | 65 |

*Quantity in wt. % in terms of the weight of the clinker being ground.

It is apparent from table 2 that the presence of retardants does not negatively influence the increase in grinding efficiency of the grinding aid. In the case of Z3, a surprising increase in grinding efficiency was even found.

Furthermore, the compressive strength of a mortar containing cement so ground was determined.

TABLE

Composition of the mortar mixture

| Composition of the mortar mixture: standard mortar per EN 196-1 | Quantity in g |
|---|---|
| Cement obtained in the above grinding trials | 450 |
| Tap water | 225 |
| Standard sand 0-4 mm | 1350 |

The cement used was the cement obtained in the above grinding trials. It had a Blaine fineness (EN 196-6) of around 4000 cm2/g.

The mortar was prepared according to EN 196-1 and placed in the molds and compacted. The compressive strength of the resulting mortar mixtures was measured (see table 3). The test to determine the compressive strength (in N/mm2) on prisms (40×40×160 mm) was done after 1 day and 2 days according to EN 196-1.

TABLE 3

Compressive strengths in N/mm2 after 1 day and 2 days (d).

| | Compressive strength | |
|---|---|---|
| Addition | After 1 d (N/mm2) | After 2 d (N/mm2) |
| no addition | 14.2 | 25.1 |
| Z1 | 15.2 | 25.7 |
| Z2 | 14.5 | 26.4 |
| Z3 | 14.3 | n.a. |

As can be seen from table 3, the exemplary additive compositions lead to a slight increase in the compressive strength after 1 day and 2 days. This shows that the retardant does not lose its retarding effect in the course of the grinding process.

The spreading after 5 minutes, 30 minutes and 60 minutes was measured for the above described mortar according to EN 196-3.

TABLE 4

Spreading in mm after 5 min, 30 min and 60 min

| | Spreading (mm) | | |
|---|---|---|---|
| Addition | After 5 min | After 30 min | After 60 min |
| no addition | 189 | 176 | 169 |
| V1 | 191 | 176 | 168 (−1%) |
| Z1 | 191 | 176 | 170 |
| Z2 | 191 | 176 | 169 |
| V4 | 187 (−1%) | 169 (−4%) | 163 (−4%) |

As can be seen from table 4, the exemplary additive compositions show spreading at the measured points of time that correspond to the measurements of the mortar composition without addition. Comparison example V4, which employed TIPA and TEA organic amines with a molecular weight Mw less than 500 g/mol, as grinding aid, shows on the other hand a reduced spreading already after 30 minutes, despite the presence of retardant.

V2, V3 and Z4 were used in a cement plant with a ball mill with sifter for the grinding of clinker. Concrete mixtures were prepared from the obtained cements and their degree of spreading was measured in accordance with EN 12350-5 after 3 minutes, 8 minutes, 15 minutes, 30 minutes, 45 minutes and 60 minutes.

TABLE 5

Spreading in mm after 3 min, 8 min, 15 min, 30 min, 45 min and 60 min

| | Spreading (mm) | | | | | |
|---|---|---|---|---|---|---|
| Additive | after 3 min | after 8 min | after 15 min | after 30 min | after 45 min | after 60 min |
| V2 | 380 | 520 | 500 | 460 | 430 | 410 |
| V3 | 400 | 520 | 500 | 440 | 410 | 410 |
| Z4 | 380 | 530 | 500 | 470 | 460 | 450 |

As can be seen from table 5, when using an exemplary additive composition, the delay of the stiffening lasts longer than when using organic amines as grinding aids (V2) or organic amines as grinding aids in combination with retardants (V3).

The potential for brown discoloration of V1-V4 and Z1-Z3 was tested based on the brown discoloration method (HTC method), which is described in "Reducing the brown discoloration risk of concrete objects" (Härdtl et al, BFT Betonwerk+Fertigteil-Technik, No. 11, 2003, pages 34-46, Bauverlag).

A mortar mixture was prepared according to the following table:

TABLE

| mortar mixture | |
| --- | --- |
| Composition of the mortar mixture: | Quantity in g |
| Cement | 259 |
| Tap water | 192 |
| Standard sand 0-4 mm | 1350 |
| Foamer | 0.13 |

The cement was ground in a drum ball mill of the Siebtechnik company, according to the previously described method, with addition of the additive indicated in table 6, from cement clinker (60% C3S, 20% C2S, 10% C3A, 10% C4AF) down to a Blaine fineness (EN 196-6) of around 4000 cm2/g.

The mortar was prepared according to EN 196-1, provided with a foaming agent, filled into a polybag PE pressure closure bag and formed into slabs around 0.5 cm thick. This was closed and kept for 7 days at 20° C./65% relative humidity. The addition of a foaming agent produces an easily worked mortar which has no tendency to give off water, despite a high water/cement ratio. The added quantity of foaming agent helps to achieve a comparable porosity in the mortar.

After this, the polybag PE pressure closure bag was provided with an incision 10 mm in length in 2 places. The water present in the mortar can evaporate through these incisions and result in a bloom there. The color of the bloom varies from "white" to "yellow" and on to a strong "brown". After this, the samples were kept for 28 days at 20° C./65% relative humidity. The blooms of the samples were then evaluated quantitatively by means of a color measurement. The results are shown in table 6.

TABLE 6

| Δb values and brown discoloration | | | |
| --- | --- | --- | --- |
| | Qty of addition (wt. %) | Δb value | Brown discoloration |
| no addition | — | 0.64 | − |
| V1 | 0.05 | 0.58 | − |
| V2 | 0.05 | 1.08 | ++ |
| V3 | 0.05 | 0.97 | + |
| V4 | 0.05 | 1.28 | ++ |
| Z1 | 0.05 | 0.62 | − |
| Z2 | 0.05 | 0.58 | − |
| Z3 | 0.05 | 0.63 | − | wt. % in terms of the weight of the clinker being ground.

The brown discoloration of the samples was evaluated on the basis of the following rating scale:
− slight, Δb value <0.7
+ distinct, Δb value 0.7-1.0
++ strong, Δb value >1.0

It is clear from table 6 that when using the exemplary additive composition the samples have a significantly lower brown discoloration than when using grinding aids that have organic amines with a molecular weight Mw less than 500 g/mol.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of delaying a setting of an aqueous mineral binding agent, the method comprising:
   providing a composition comprising a cement clinker and an additive composition, the additive composition containing:
      at least one retardant including boric acid or a salt thereof,
      a plurality of grinding aids, wherein the plurality of grinding aids includes a glycol, a comb polymer, and a monocarboxylic acid with 1 to 4 carbon atoms, and
      optionally, an amount of organic amines with a molecular weight Mw of less than 500 g/mol and ammonium salts thereof being 0-2 wt. %, with respect to a weight of the additive composition; and
   preparing a mineral binding agent by grinding the composition.

2. The method according to claim 1, wherein the diglycol is diethylene glycol.

3. The method according to claim 1, wherein the glycol is a diglycol.

4. The method according to claim 1, wherein the monocarboxylic acid with 1 to 4 carbon atoms is acetic acid.

5. The method according to claim 1, wherein the comb polymer includes side chains bonded to a linear polymer backbone via ester groups.

6. The method according to claim 1, wherein the at least one retardant further comprises one selected from the group consisting of:
   a cellulose ether, casein, dextrin, zinc, lead, phosphate, phosphonate, silicone fluoride, oxalic acid or a salt thereof, lactic acid or a salt thereof, succinic acid or a salt thereof, adipic acid or a salt thereof, tartaric acid or a salt thereof, gluconic acid or a salt thereof, heptonic acid or a salt thereof, citric acid or a salt thereof, gallic acid or a salt thereof, malic acid or a salt thereof, saccharose, glucose, fructose, and a combination thereof.

7. The method according to claim 1, wherein a weight fraction of the retardant is 0.2-30 wt %, with respect to a weight of the additive composition.

8. The method according to claim 1, wherein a weight fraction of the grinding aid is 0.2-99.8 wt %, with respect to a weight of the additive composition.

9. The method according to claim 3, wherein the diglycol is diethylene glycol.

10. The method according to claim 1, wherein the at least one retardant further comprises one selected from the group consisting of:
   gluconic acid or a salt thereof, saccharose, glucose, fructose, and any combination thereof.

11. The method according to claim 1, wherein the amount of organic amines with a molecular weight Mw of less than 500 g/mol and ammonium salts thereof in the additive composition is 0-0.1 wt. %, with respect to the weight of the additive composition.

12. The method according to claim 1, wherein the boric acid or salt thereof is present in an amount of 1-5 wt. %, in terms of the additive composition Z, wherein the glycol is an alkylene glycol, and the alkylene glycol is present in an amount of 15-30 wt. %, in terms of the additive composition Z, wherein the comb polymer is a comb polymer of Formula (I), and the comb polymer of formula (I) is present in an amount of 15-35 wt. %, in terms of the additive composition Z, wherein the monocarboxylic acid with 1 to 4 carbon atoms is acetic acid, and the acetic acid is present in an amount of 1-5 wt. %, in terms of the additive composition Z;

Formula (I)

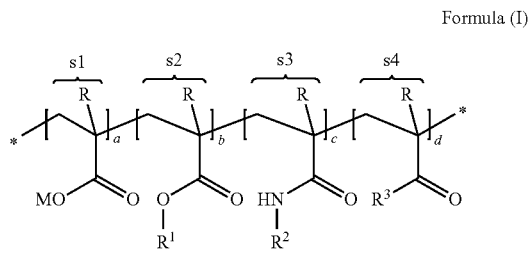

wherein:

M stands independently of each other for H+, alkaline metal ion, alkaline earth metal ion, divalent or trivalent metal ion, ammonium ion, or organic ammonium group, R stands independently of each other for hydrogen or for a methyl group, R1 stand independently of each other for [AO]q-R4, and R2 stands independently of each other for a C1 to C20 alkyl group, cycloalkyl group, alkylaryl group or for [AO]q-R4, A stands independently of each other for a C2 to C4 alkylene group, R4 stands independently of each other for a C1 to C20 alkyl group, cyclohexyl group or alkylaryl group, q represents a value of 2 to 250, R3 stand independently of each other for —NH2, —NR5R6, —OR7NR8R9, R5 and R6 independently of each other stand for a C1 to C20 alkyl group, cycloalkyl group, alkylaryl group, aryl group, hydroxyalkyl group, acetoxyethyl group, a hydroxy-isopropyl group, or an acetoxyisopropyl group; or R5 and R6 together form a ring, of which nitrogen is a part, to construct a morpholine or imidazoline ring, R7 stands for a C2-C4 alkylene group, R8 and R9 each stand independently of each other for a C1 to C20 alkyl group, cycloalkyl group, alkylary group, aryl group, or hydroxyalkyl group, a sequence of structural units s1, s2, s3 and s4 in formula (I) is arranged alternating, in block fashion, or randomly, a, b, c and d represent molar ratios of the structural units s1, s2, s3 and s4, respectively, wherein:

a=0.1-0.9, b=0.1-0.9, c=0-0.8, and d=0-0.3.

13. The method according to claim 12, wherein the boric acid or salt thereof is boric acid, and the alkylene glycol is diethylene glycol.

* * * * *